Patented July 29, 1924.

1,502,896

UNITED STATES PATENT OFFICE.

OSCAR L. BARNEBEY, OF DETROIT, MICHIGAN.

PROCESS FOR THE UTILIZATION OF VEGETABLE MATERIALS AND MANUFACTURE OF GAS ADSORBENT AND DECOLORIZING CARBONS.

No Drawing. Application filed March 23, 1921. Serial No. 454,972.

*To all whom it may concern:*

Be it known that I, OSCAR L. BARNEBEY, a citizen of the United States, residing in Detroit, in the county of Wayne and State of Michigan, have invented certain new and useful Improvements in a Process for the Utilization of Vegetable Materials and Manufacture of Gas Adsorbent and Decolorizing Carbons, of which the following is a specification.

The invention relates to a process of treating vegetable materials, especially plants which at present are discarded as waste materials of no value, with the object of securing therefrom products valuable in the industrial arts. This conversion of waste materials into valuable products can be accomplished by carbonizing the vegetable materials, reacting chemically with the ash constituents (ingredients other than carbon) to decompose the insoluble materials and then removal of the products by the appropriate means such as distillation, extraction, etc. The carbon residue, after washing and drying, constitutes an effective decolorizing carbon especially useful in the purification of sugar solutions, vegetable oils and the like. One method of accomplishing these ends has been made the subject matter of my co-pending application, Serial No. 454,973. This invention is applicable to the same general materials as the co-pending application, but deals with an entirely different process to accomplish the ends in view.

My process in its preferred form involves the following steps: First, the vegetable matter is carbonized; second, the carbonized material is treated with hydrofluoric acid usually in the presence of a strong mineral acid such as hydrochloric acid; third, the volatile silicon tetrafluoride is conducted into water, the latter decomposing the former into insoluble hydrated silicic acid, which is filtered away from the soluble fluo-silicic acid; fourth, the carbon is filtered out, washed and dried; fifth, the soluble non-volatile salts, such as chlorides, remaining in the aqueous solution after volatilization of the silicon tetrafluoride, are evaporated to dryness or separated by conventional methods well known in the chemical industries.

In carrying out my process, I prefer to carbonize the plant material as completely as possible, yet avoid extreme temperatures to prevent sintering or fusing of the ash constituents into the carbon, as well as shrinkage of the carbon itself. The carbonizing is best conducted so that little or no hydrocarbons remain in the resultant carbon. The temperature used depends upon the length of time the material is to be heated at that temperature, and the method of removal of the products of distillation. In general, it may be stated that temperatures from 400° C. to 700° C. are satisfactory, although temperatures lower and higher than this range may be used. When the temperature is lower, the carbonization requires a longer time and when higher, the process becomes more expensive for maintenance of the furnaces and the cost of heating is greater. During carbonization, the products of distillation are best removed as rapidly as formed. They may be recovered, yielding acetone, alcohol, pyroligneous acid, or acetates and tar if desired. If recovery is not desired, the distillate is burned to furnish the heat required for retorting or for any other heat consuming purpose or both. When recovered, the products are handled in accordance with conventional practice used in the wood distillation industry.

The carbonized material consists of carbon, (perhaps containing small amounts of hydrocarbons if the carbonization has been incomplete due to too low temperature or too short a time), silica as such or as silicates, sulfur as compounds thereof, phosphorus or phosphates, potassium along with lesser amounts of sodium essentially as carbonates or silicates, calcium and magnesium as silicates or carbonates, alumina, and iron as metal or oxide, along with lesser amounts of other ingredients, the nature and extent depending upon the specific plant source. When desired, the carbonized material can be subjected to an activating treatment with oxygenated gases in accordance with the invention described in my co-pending application, Serial No. 485,386. However, this treatment fundamentally belongs to the last named invention and is not considered a part of the present application.

This carbonized material is treated with a mixture of hydrofluoric and hydrochloric or sulfuric acids in the proper proportion to give sufficient of the former to combine with substantially all or almost all of the silica present, and sufficient of the latter to convert the soluble bases into chlorides or sulfates. To leave any definite percentage of silica in the carbon all that is necessary is to regulate the amount of hydrofluoric acid added. The higher the silica content, the more the hydrofluoric acid required and the higher the base content, the higher the hydrochloric or sulfuric acid content must be to remove the same. Inasmuch as the reaction is strongly exothermic, the dilution is regulated so that there is no loss of hydrofluoric acid by volatilization. The same action can also be secured by the rate of addition of the hydrofluoric acid or by cooling. The silica reacts as follows:

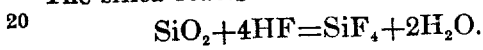
$$SiO_2 + 4HF = SiF_4 + 2H_2O.$$

The silicates present are also decomposed, the bases yielding soluble chlorides and the silica yielding volatile silicon tetrafluoride. This action accomplishes two functions, it removes the silicon and it opens up the ash constituents so that the remainder is effectively extracted with hydrochloric or sulfuric acid, leaving carbon which upon subsequent washing with acidulated water will be free from impurities. By this double action, the carbon surfaces are rendered clean and bright, which is necessary for good gas adsorbents and for decolorization.

The carbon is filtered from the aqueous solution and thoroughly washed and dried. The carbon thus prepared is an excellent decolorizer and is sold as such. The gaseous products are conducted away. The gas containing essentially silicon tetrafluoride is passed into water, producing silicic acid and fluosilicic acid thus:

$$3SiF_4 + 3H_2O + XH_2O = 2H_2SiF_6 + H_2SiO_3 \cdot XH_2O.$$

Some hydrofluoric acid is probably formed thus:

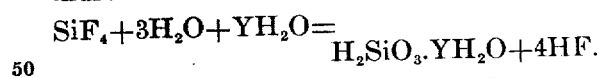
$$SiF_4 + 3H_2O + YH_2O = H_2SiO_3 \cdot YH_2O + 4HF.$$

However, the hydrofluoric acid thus produced has a tendency to redissolve the silicic acid to form the fluosilicic acid thus:

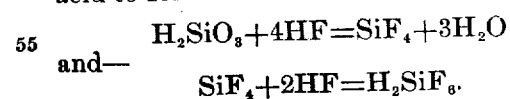
$$H_2SiO_3 + 4HF = SiF_4 + 3H_2O$$
and—
$$SiF_4 + 2HF = H_2SiF_6.$$

The hydrated silicic acid is filtered off, washed, dried and marketed as adsorbent silica or for any other useful purpose. The soluble fluosilicic acid in solution is sold for electrolytic bath liquor or for any other useful purpose.

The residual chloride or sulfate solution is evaporated to dryness or the salts separated by the usual methods applicable to the same and in accordance with the specific materials and amounts of the same present. The solid residue can be sold as such for fertilizer or other purposes, or the purified chemicals can be sold in their respective markets. In general, if the lime content is high I prefer to use hydrochloric acid with the hydrofluoric although sulfuric acid can be used, and if the potash is high with low lime content, I prefer to use sulfuric acid due to its cheapness at the present time.

I have found that this method is very economical and easy of performance. The hydrofluoric acid is cheaply produced by action of sulphuric acid on fluospar. The reactions take place at very ordinary temperatures and are readily controlled. The control can be regulated to leave any desired amount of silica or other extractable matter in the carbon.

The carbon product of my process has an enormous adsorptive and decolorizing capacity. I believe that one of the important reasons for this is that in my process I employ vegetable matter as starting material; for in such vegetable matter the mineral constituents, such as silica, are distributed through the material relatively uniformly and in an extremely finely divided state, and when these mineral constituents are removed by the chemical treatment of the char there results an exceedingly fine porous structure with enormous aggregate internal surface area and correspondingly great adsorptive and decolorizing capacity.

While I have set forth specifically the preferred procedure in carrying out my process, it will be understood that there can be various modifications of the procedure without departing from the invention as defined in the appended claims.

What I claim is:

1. The process of treating vegetable carbonaceous materials to effect the economic utilization of constituents thereof including carbon, which comprises charring said materials, treating the charred materials with hydrofluoric acid and a mineral acid other than hydrofluoric acid to convert the silica thereof into volatile silicon tetra-fluoride and extract the base constituents thereof as soluble salts of mineral acids, and washing and drying the residual carbon.

2. In a process of treating vegetable carbonaceous materials to effect the economic utilization of constituents thereof, the steps which comprise charring said materials, and treating the charred materials with hydrofluoric acid and a mineral acid other than hydrofluoric acid to convert their constituent silica into volatile silicon tetra-fluoride and their base constituents into soluble salts of mineral acids.

3. In a process of treating vegetable carbonaceous materials to effect the economic utilization of constituents thereof, the steps which comprise charring the materials with hydrofluoric acid, and treating the charred materials to convert their constituent silica into volatile silicon tetra-fluoride.

4. In the process of treating vegetable carbonaceous materials to effect the economic utilization of constituents thereof, the steps which comprise charring said materials at temperatures between 400° C. and 700° C., removing the distillate as rapidly as formed, and removing the ash constituents by treatment with hydrofluoric acid.

5. In a process of treating vegetable carbonaceous materials to effect the economic utilization of constituents thereof, the steps which comprise charring said materials at temperatures between 400° C. and 700° C., and removing the ash constituents by treatment with hydrofluoric acid.

6. In a process of treating vegetable carbonaceous materials to effect the economic utilization of constituents thereof, the steps which comprise charring the said materials, and removing the ash constituents by treatment with hydrofluoric acid and hydrochloric acid.

7. In a process of treating vegetable carbonaceous materials to effect the economic utilization of constituents thereof, the steps which comprise charring said materials, and removing the ash constituents by treatment with hydrofluoric acid and mineral acid other than hydrofluoric acid.

In testimony whereof, I hereunto affix my signature.

OSCAR L. BARNEBEY.

Certificate of Correction.

It is hereby certified that in Letters Patent No. 1,502,896, granted July 29, 1924, upon the application of Oscar L. Barnebey, of Detroit, Michigan, for an improvement in "Processes for the Utilization of Vegetable Materials and Manufacture of Gas Absorbent and Decolorizing Carbons," an error appears in the printed specification requiring correction as follows: Page 3, lines 3 and 4, claim 3, strike out the words "with hydrofluoric acid" and insert the same to follow after the word "materials" in line 5 of same claim; and that the said Letters Patent should be read with this correction therein that the same may conform to the record of the case in the Patent Office.

Signed and sealed this 28th day of October, A. D. 1924.

[SEAL.]
KARL FENNING,
*Acting Commissioner of Patents.*